(No Model.)
C. K. BRADFORD.
FISHING LINE ATTACHMENT.
No. 422,331. Patented Feb. 25, 1890.
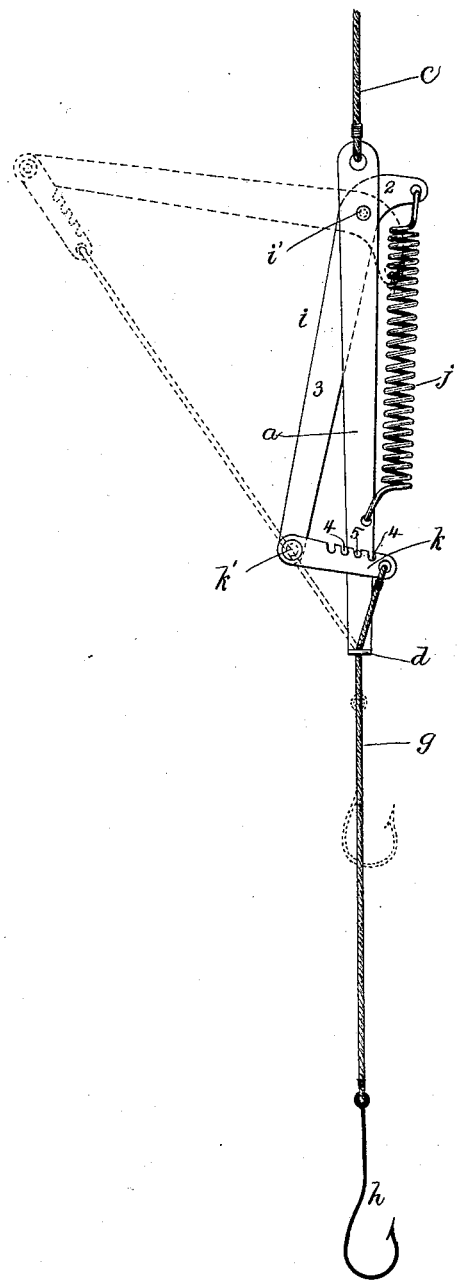
WITNESSES:
A. D. Harrison
W. C. Ramsay
INVENTOR:
C. K. Bradford
by Wright Brown Crosley
Attys.

UNITED STATES PATENT OFFICE.

CHARLES K. BRADFORD, OF LYNNFIELD, MASSACHUSETTS.

FISHING-LINE ATTACHMENT.

SPECIFICATION forming part of Letters Patent No. 422,331, dated February 25, 1890.

Application filed May 20, 1889. Serial No. 311,356. (No model.)

*To all whom it may concern:*

Be it known that I, CHARLES K. BRADFORD, of Lynnfield, in the county of Essex and State of Massachusetts, have invented certain new and useful Improvements in Fishing-Line Attachments, of which the following is a specification.

This invention has for its object to provide an attachment for fishing-lines whereby a pull on the bait will cause a quick automatic upward movement of the hook to facilitate the capture of the fish.

The invention consists in the combination of a plate or strip of metal adapted to be attached at one end to a section of fishing-line, and provided at its other end with an eye or guide, a bell-crank lever pivoted to said strip and having a longer and a shorter arm, a spring connecting the shorter arm of said lever to the said plate or strip, and a latch pivoted at one end to the longer arm of said lever and adapted to be engaged with said plate or strip, the swinging end of said latch being formed for engagement with a section of fishing-line to which a hook is attached, the arrangement being such that when the device is set the hook-section of the line passes through the eye or guide of the plate or strip, and is thereby held in position to displace the latch when the bait or hook is pulled by a fish. The displacement of the latch releases the lever, the longer arm of which is thereupon thrown upwardly by the spring and caused to give the hook a quick upward movement, as I will now proceed to describe.

The accompanying drawing, forming a part of this specification, represents a side view of my improved device attached to the sections of fishing-line above referred to.

In the drawing, $a$ represents a plate or strip, which has at one end an orifice to receive one end of a section $c$ of fishing-line and at the other end an ear or guide $d$, containing an orifice through which another section $g$ of fishing-line passes, the last-named section having a hook $h$ attached to its lower end.

$i$ represents a bell-crank lever pivoted at $i'$ to the plate, and having a shorter arm 2 and a longer arm 3. The shorter arm 2 is connected by a spring $j$ with the plate $a$.

$k$ represents a latch pivoted at $k'$ to the swinging end of the longer arm of the lever $i$, and having notches 4 in one edge adapted to engage a stud 5 on the plate $a$. When a notch of the latch is engaged with said stud, the lever $i$ is held in the position shown in full lines, and when the latch is disengaged from the stud the spring throws the lever to the position shown by dotted lines, thereby raising the longer arm of said lever.

The hook-section $g$ of the line is attached to the swinging end of the latch $k$ and passes through the guide or ear $d$ of the plate $a$. Said ear holds the line-section $g$ in such position that when a fish pulls on the hook the swinging end of the latch is disengaged from the stud 5 and the lever $i$ is thrown upwardly by the spring $j$, thus quickly raising the hook and making its engagement with the fish's mouth very likely. It will be seen, therefore, that the fisherman is not obliged to exercise the usual careful scrutiny of his line and is not obliged to pull until the fish has been hooked.

I claim—

The improved fishing-line attachment having the strip or plate $a$ for attachment to a line-section and provided at its lower end with a guide $d$ for another line-section, and having a lateral pin or projection near said lower end, in combination with the lever $i$, pivoted to said plate and having a longer and a shorter arm, a spring connecting the shorter arm with the plate $a$, and a latch or arm pivoted at one end to the longer arm of said lever and adapted to engage with the projection on the plate $a$, and provided at its outer end with means for attachment to a line-section, the combination being and operating substantially as described.

In testimony whereof I have signed my name to this specification, in the presence of two subscribing witnesses, this 8th day of May, A. D. 1889.

CHARLES K. BRADFORD.

Witnesses:
C. F. BROWN,
ARTHUR W. CROSSLEY.